(12) United States Patent
Mysker et al.

(10) Patent No.: US 7,544,118 B2
(45) Date of Patent: Jun. 9, 2009

(54) HYBRID FILLING SYSTEM

(75) Inventors: Thomas Mysker, Twin Lakes, WI (US);
Eggo Haschke, Deerfield, IL (US);
Joachim Meyrahn, Frankfort (DE)

(73) Assignee: Poly-Clip System Corp., Mundelein, IL (US)

( * ) Notice: Subject to any disclaimer, the term of this patent is extended or adjusted under 35 U.S.C. 154(b) by 79 days.

(21) Appl. No.: 11/552,772

(22) Filed: Oct. 25, 2006

(65) Prior Publication Data

US 2008/0139095 A1 Jun. 12, 2008

(51) Int. Cl.
*A22C 11/00* (2006.01)
(52) U.S. Cl. ..................................................... 452/32
(58) Field of Classification Search ............. 452/21–27, 452/30–37, 46–48, 51
See application file for complete search history.

(56) References Cited

U.S. PATENT DOCUMENTS

| | | | | | |
|---|---|---|---|---|---|
| 3,964,236 | A | * | 6/1976 | Smith | 452/34 |
| 4,563,792 | A | * | 1/1986 | Niedecker | 452/31 |
| 4,893,377 | A | * | 1/1990 | Evans et al. | 452/34 |
| 4,958,477 | A | | 9/1990 | Winkler | |
| 6,139,416 | A | | 10/2000 | Topfer | |
| 6,572,464 | B1 | * | 6/2003 | Hergott et al. | 452/33 |
| 6,659,854 | B1 | * | 12/2003 | Hergott et al. | 452/33 |
| 2006/0000188 | A1 | | 1/2006 | Nikoley et al. | |

FOREIGN PATENT DOCUMENTS

WO 2008052129 A2 5/2008

OTHER PUBLICATIONS

International Search Report and Written Opinion of the International Searching Authority, received in the PCT case corresponding to this application.

* cited by examiner

*Primary Examiner*—Thomas Price
(74) *Attorney, Agent, or Firm*—Trexler, Bushnell, Giangiorgi, Blackstone & Marr, Ltd

(57) ABSTRACT

A system for producing food products is described. The system comprises a mixer, a stationary horn connected to the mixer and mounted in a heat-sealer, a plow connected to the stationary horn, a first product horn having a first end and a second end, the first product horn being rotatably attached to the heat-sealer and movable from a first position whereby the first end is attachable to the stationary horn and the second end is proximate a clipper, to a second position remote from the stationary horn and the clipper, and a second product horn having a first end and a second end, the second product horn being rotatably attached to the heat sealer and movable from a first position remote from the stationary horn and the clipper, to a second position whereby the first end is attachable to the stationary horn and the second end is proximate the clipper.

2 Claims, 4 Drawing Sheets

HYBRID FILLING SYSTEM

BACKGROUND OF THE INVENTION

This invention relates to generally to the field of preparing food products in tubular casings. The invention relates more specifically to the field of preparing sausages and whole-muscle meats. The invention will be described as used for the production of sausages, but it applies equally to the production of whole-muscle meats, cheeses, vegetarian food products, and any other material that is wrapped in a casing.

Sausages are conventionally produced by extruding a pasty mixture of meat products, spices, and fillers into a tubular casing. (Some sausages are then wrapped in netting prior to processing.) The casing comes in several forms. Edible collagen films, for example, including flavored and colored films, remain on the sausage after processing. Inedible films are used solely for packing the sausage and are removed prior to use.

There are two types of casings conventionally used: tubular casings and flat sheets. Tubular casings are shirred onto a horn that is then placed over the discharge of the sausage stuffer/clipper. Illustrative processes and devices for making sausage from tubular casings are described in, for example, U.S. Pat. No. 5,024,041 to Urban, Process for Filling Tubular Casings and in U.S. Pat. No. 7,063,610 to Mysker, Apparatus and Method to Net Food Products in Shirred Tubular Casing, the disclosures of which are both incorporated herein by reference. This method has the advantage of not having a seam in the casing. However, the casing must first be shirred over a horn before use, which adds a step in the manufacturing process. Additionally, once the shirred casing on the horn runs out, the sausage-making process must be stopped to remove the empty horn and to either re-shir the horn with fresh casing or to attach a spare horn on which casing has already been shirred.

In another method, flat sheets of film, such as collagen film, are turned over plows by an automatic heat-sealing machine to produce a tubular casing. A representative process is shown in, for example, U.S. Pat. No. 4,985,477 to Winkler, Apparatus for Production of Meat Products. The use of flat sheets eliminates the need to shir the casing onto a horn prior to use and allows for extended use. But some films cannot be heat sealed and accordingly are not well-adapted to this method. Additionally, this method leaves a seam in the casing, which can be undesirable.

A sausage maker using one of these methods may need to switch to the other method because of production needs caused by customer demands. Switching a sausage-making line from one method to the other causes an interruption in the manufacturing process. A conventional sausage stuffer/clipper can operate continuously for a long period of time. But every time the sausage maker wants to switch from one type of casing to the other, the manufacturing process must be stopped to change the equipment. A need exists for an apparatus that will minimize the downtime caused by switching from one type of casing to another. The present invention meets this need.

BRIEF SUMMARY OF THE INVENTION

The system of the present invention, in a first embodiment, has a mixer, a stationary horn connected to the mixer and mounted in a heat-sealer, a plow connected to the stationary horn, a first product horn having a first end and a second end, the first product horn being connectable to the heat-sealer and movable from a first position whereby the first end is attachable to the stationary horn and the second end is proximate a clipper, to a second position remote from the stationary horn and the clipper, and a second product horn having a first end and a second end, the second product horn being connectable to the heat sealer and movable from a first position remote from the stationary horn and the clipper, to a second position whereby the first end is attachable to the stationary horn and the second end is proximate the clipper. The system can also comprise a flat film connected to the plow to form tubular rolled stock casing on the stationary horn and first product horn, and pre-formed tubular casing shirred onto the second product horn.

In another embodiment, the present invention is a method comprising the steps of providing a stationary horn, providing a plow connected to the stationary horn, providing a first product horn having a first end and a second end, the first product horn being connectable to a downstream end of the stationary horn and movable from a first position whereby the first end is attachable to the downstream end of the stationary horn and the second end is proximate a clipper, to a second position remote from the stationary horn and the clipper, and providing a second product horn having a first end and a second end, the second product horn being connectable to the downstream end of the stationary horn and movable from a first position remote from the stationary horn and the clipper, to a second position whereby the first end is attachable to the downstream end of the stationary horn and the second end is proximate the clipper. In a further embodiment, the method comprises placing the first product horn in the first position of the first product horn, placing the second product horn in the first position of the second product horn, attaching the first product horn to the downstream end of the stationary horn, providing a flat film mounted on the plow, turning the film over the plow and sealing the film to form rolled stock casing over the stationary horn and the first product horn, extruding food products through the stationary horn and the first product horn to fill the rolled stock casing, and clipping the filled rolled stock casing. In a further embodiment, the method comprises shirring tubular casing onto the second product horn, placing the first product horn in the second position of the first product horn, placing the second product horn in the second position of the second product horn, attaching the second product horn to the downstream end of the stationary horn, removing the film from the plow, extruding food products through the stationary horn and the second product horn to fill the tubular casing, and clipping the tubular casing.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT OF THE INVENTION

Figure 1:
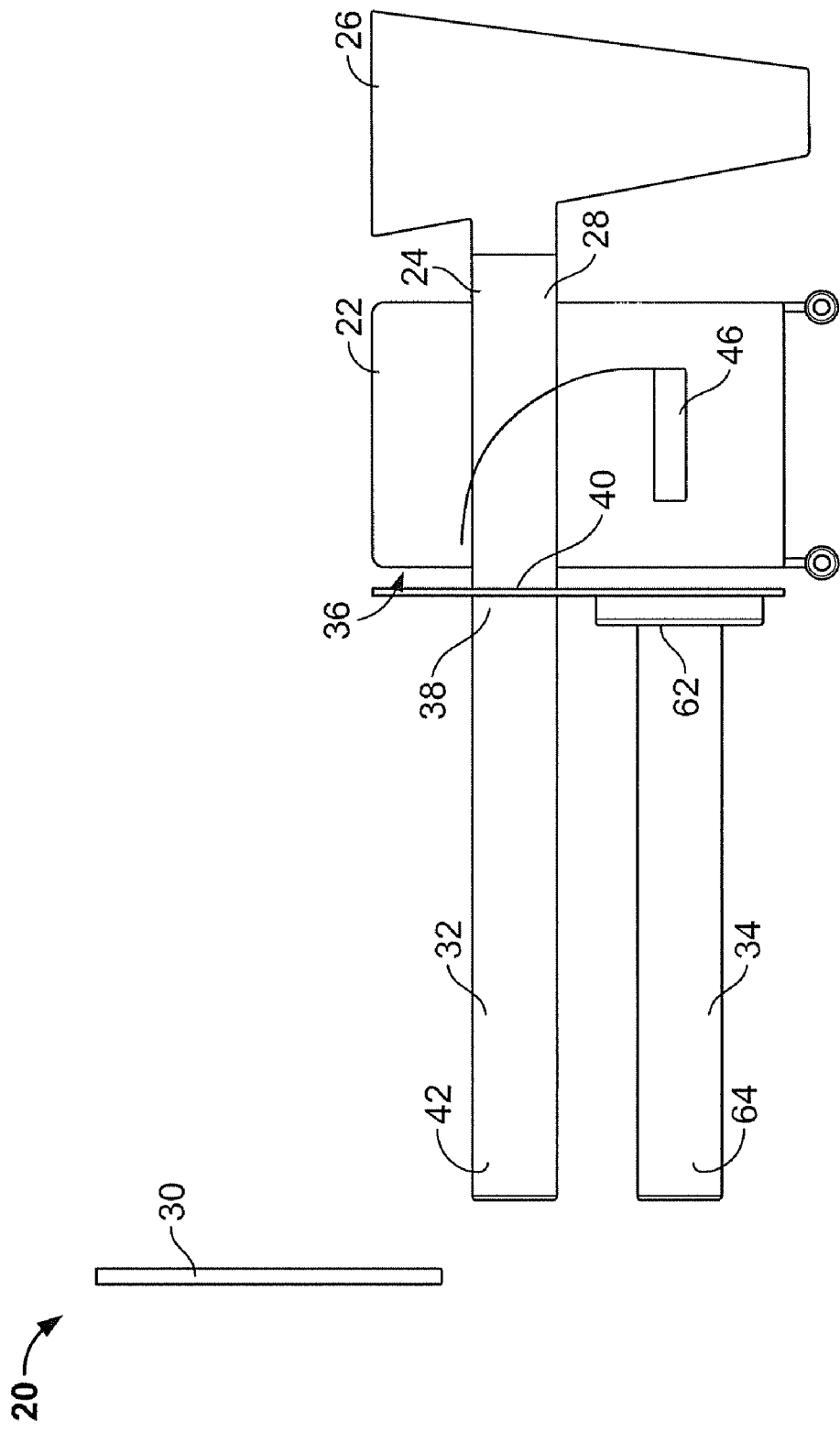
FIG. 1 is a side view of the system of the preferred embodiment of the invention, with the product horns in the first position but no casing being shown.

While the invention may be susceptible to embodiment in different forms, there is shown in the drawings and described herein a specific embodiment with the understanding that the present disclosure is to be considered an exemplification of the principles of the invention and is not intended to limit the invention to what is illustrated and described.

Figure 2:
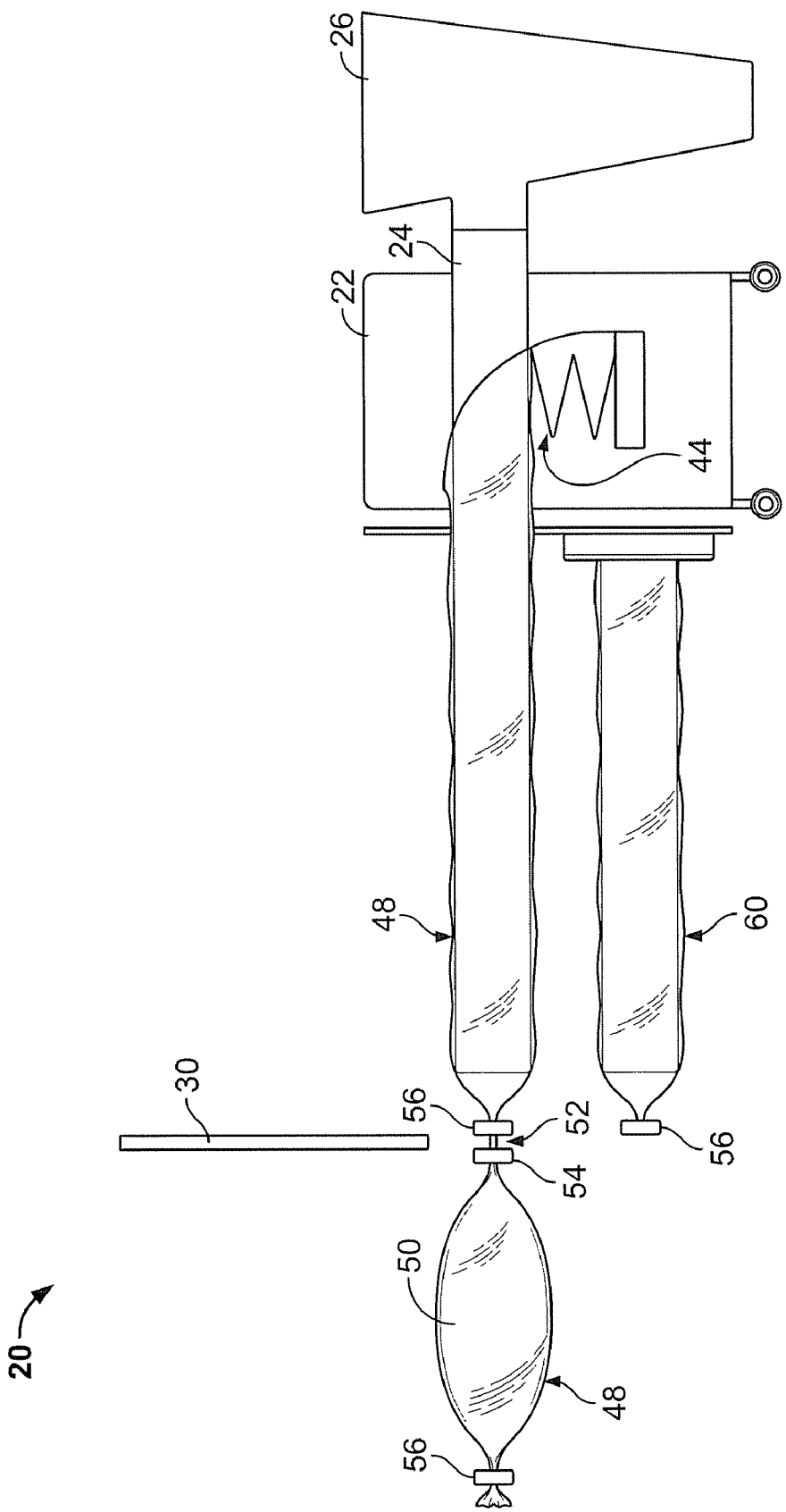
FIG. 2 is a side view of the system of FIG. 1, with the product horns in the first position and a sausage being made from rolled stock casing.
Figure 3:
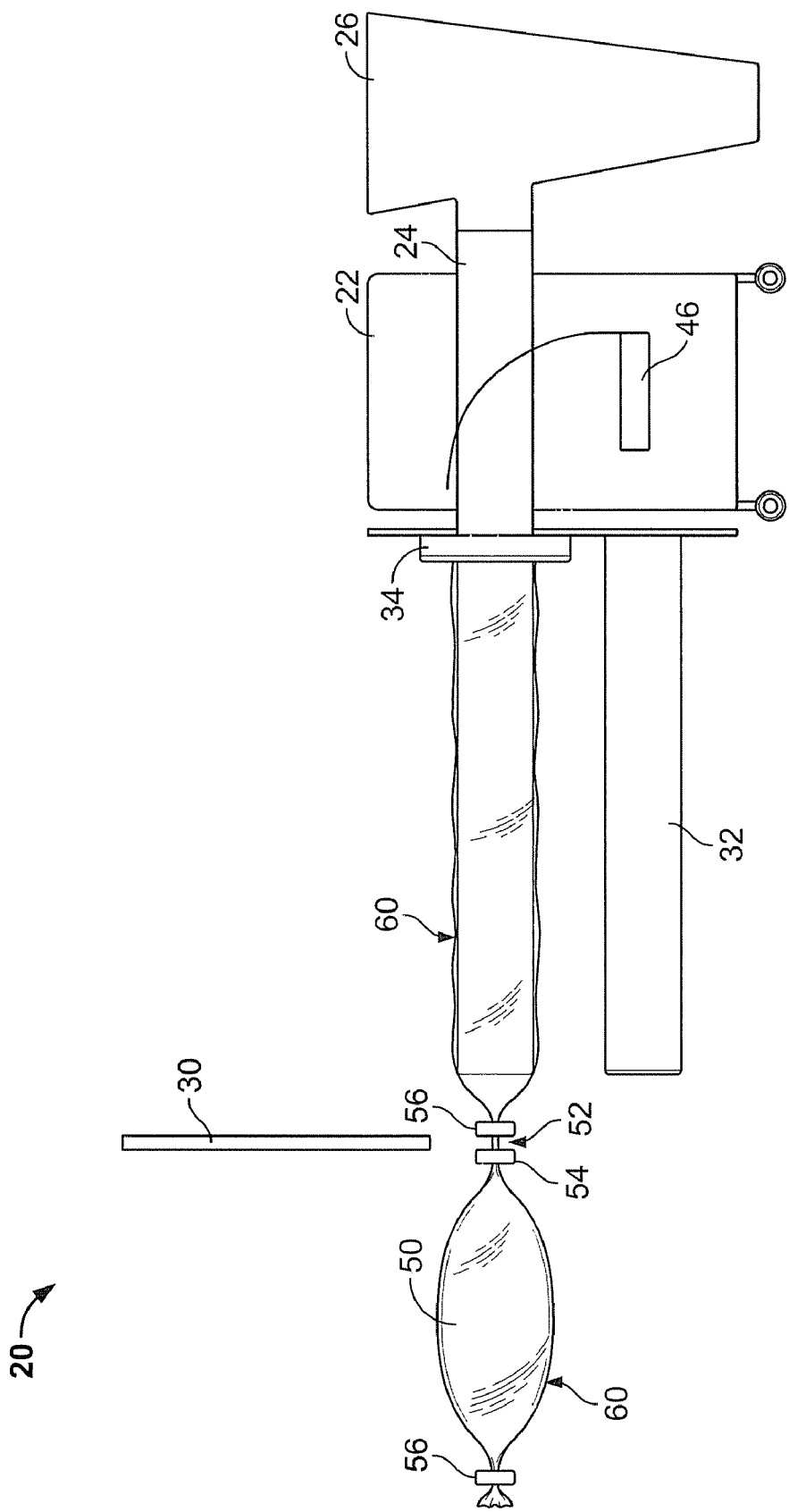
FIG. 3 is a side view of the system of FIG. 1, with the product horns in the second position and a sausage being made from pre-shirred tubular casing.

The system 20 of the present invention, as shown in FIGS. 1 through 3, has an automatic heat-sealing machine 22 in which is mounted stationary horn 24. Heat-sealing machine 22 is preferably a Poly-clip System TSA 200 Automated Sealing Machine. A sausage mixer 26 is located upstream of and is connected to the upstream end 28 of stationary horn 24. A clipper 30 is located downstream of automatic heat-sealing machine 22. Clipper 30 is preferably a Poly-clip System ICA 8700 Automatic Double Clipper.

A first product horn 32 and a second product horn 34 are rotatably attached to the downstream side 36 of heat-sealing machine 22. First product horn 32 is used for rolled stock casing formed from flat film and second product horn 34 is used with pre-shirred casings.

Please note that the food-containing components of system 20 are preferably made of stainless steel for ease of cleaning.

First product horn 32 is, in a first position, attached at its first end 38 to the downstream end 40 of stationary horn 24. The second end 42 of first product horn 32, in the first position, is located proximate to clipper 30. FIGS. 1 and 2 show system 20 with first product horn 32 and second product horn 34 in the first position. No casing is shown in FIG. 1. In the first position of second product horn 34, second product horn 34 is being stored and/or readied for use.

A flat sheet of film 44, such as an edible collagen film, which is produced in fan-fold arrangement, is mounted on and turned over a plow 46 to create a rolled stock casing 48 in the form of a tube around stationary horn 24 and first product horn 32 and heat is applied to seal the seam of rolled stock casing 48. Sausage mixer 26 combines meat products, spices, and fillers to create a pasty mixture. The mixture is extruded through stationary horn 24 and then into first product horn 32. As the mixture exits second end 42, it fills rolled stock casing 48 in a conventional manner. As the mixture expands and fills rolled stock casing 48, a sausage 50 is formed, as shown in FIG. 2. Clipper 30 grasps the filled rolled stock casing 48, separates a short section to form a neck 52, applies two clips 54, 56 to neck 52, and severs rolled stock casing 48 between the clips 54, 56. Clip 54 thus forms the back end of a completed sausage 50 and clip 56 forms the front end of what will become the next sausage 50. (Alternatively, the neck 52 is not severed and a string of sausages 50 can be formed. Some users prefer to apply a single clip 54 when forming a string of sausages 50.)

When the user wishes to switch to a different type of casing, a length of tubular casing 60 is shirred onto second product horn 34. FIG. 2 shows a length of tubular casing 60 pre-shirred onto second product horn 34. Film 44 is cut so that it no longer is formed over plow 46 and first product horn 32 is detached from stationary horn 24 and moved away from automatic heat sealing machine 22 to a second position, as shown in FIG. 3. In the second position, first product horn 36 is simply stored and is not used.

Second product horn 34 in its first position is remote from heat-sealing machine 22 and clipper 30, as shown in FIG. 2. When the user desires to make sausage from pre-shirred casing, second product horn 34 is moved into place, from its second position to its first position, as shown in FIG. 3. In its second position, second product horn 34 is attached at its first end 62 to stationary horn 24. The pasty mixture continues to be extruded from sausage mixer 26 and proceeds through stationary horn 24 into second product horn 34, and out the second end 64 of second product horn 34, where the mixture fills tubular casing 60 in the manner described above. Clipper 30 applies two clips 55, 56 as described above, to form the back end of a completed sausage 50 and the front end of what will become the next sausage 50.

Figure 4:
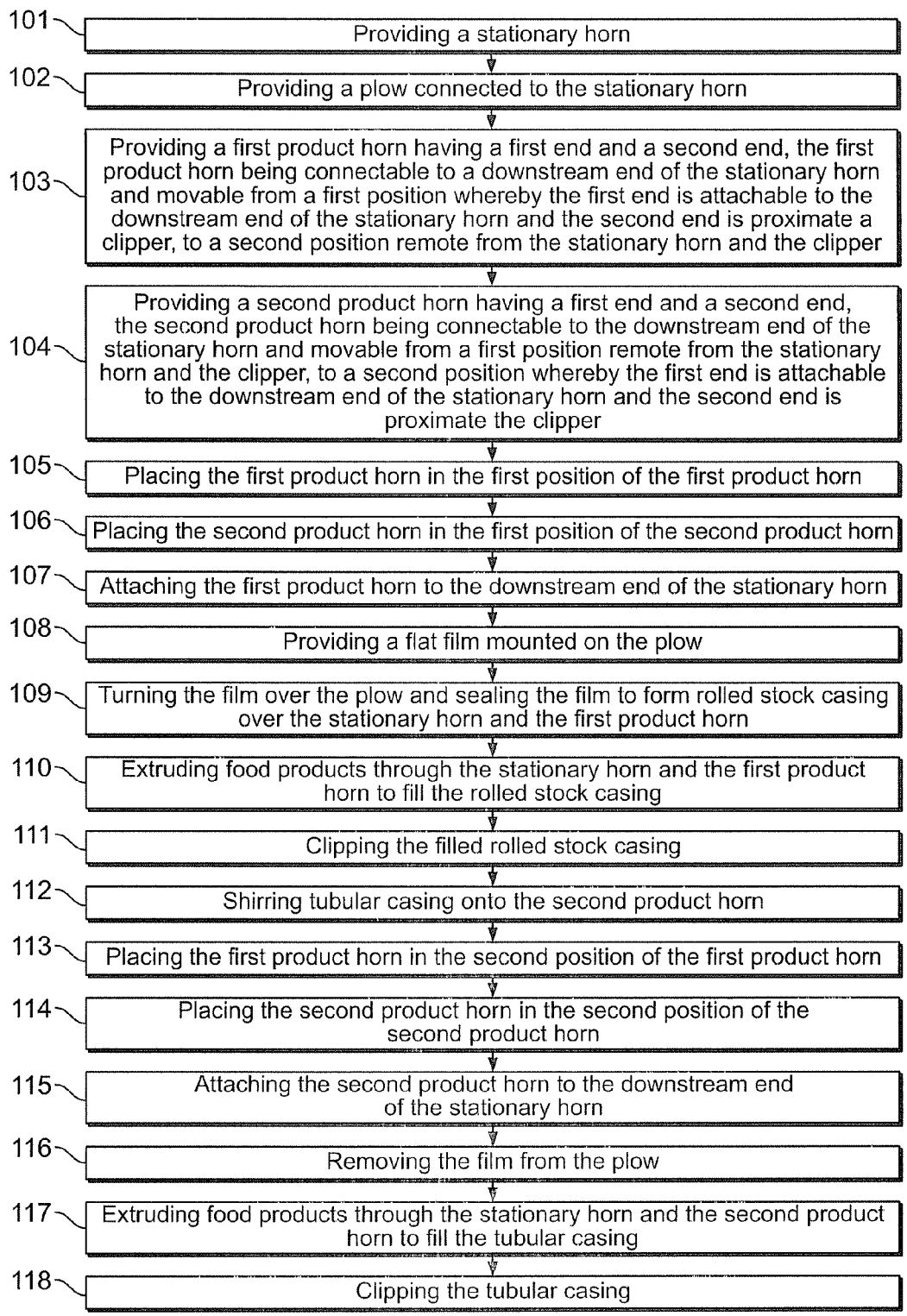
FIG. 4 is a flow chart of the method of the preferred embodiment of the present invention.

The method of the preferred embodiment of the present invention, as diagrammed in FIG. 4, uses some or all of the following steps, which need not be performed in the order stated unless implicitly required. The method of the preferred embodiment comprises the steps of:

1. providing a stationary horn,
2. providing a plow connected to the stationary horn,
3. providing a first product horn having a first end and a second end, the first product horn being connectable to a downstream end of the stationary horn and movable from a first position whereby the first end is attachable to the downstream end of the stationary horn and the second end is proximate a clipper, to a second position remote from the stationary horn and the clipper, and
4. providing a second product horn having a first end and a second end, the second product horn being connectable to the downstream end of the stationary horn and movable from a first position remote from the stationary horn and the clipper, to a second position whereby the first end is attachable to the downstream end of the stationary horn and the second end is proximate the clipper.

In a further embodiment, the method comprises the further steps of:

5. placing the first product horn in the first position of the first product horn,
6. placing the second product horn in the first position of the second product horn,
7. attaching the first product horn to the downstream end of the stationary horn,
8. providing a flat film mounted on the plow,
9. turning the film over the plow and sealing the film to form rolled stock casing over the stationary horn and the first product horn,
10. extruding food products through the stationary horn and the first product horn to fill the rolled stock casing, and
11. clipping the filled rolled stock casing.

In a further embodiment, the method comprises the further steps of:

12. shirring tubular casing onto the second product horn,
13. placing the first product horn in the second position of the first product horn,
14. placing the second product horn in the second position of the second product horn,
15. attaching the second product horn to the downstream end of the stationary horn,
16. removing the film from the plow,
17. extruding food products through the stationary horn and the second product horn to fill the tubular casing, and
18. clipping the tubular casing.

While preferred embodiments of the present invention are shown and described, it is envisioned that those skilled in the art may devise modifications of the present invention without departing from the spirit and scope of the appended claims.

The invention that is claimed is:

1. A system for producing food products, comprising:
   a mixer;

a stationary horn having an upstream end and a downstream end, said downstream end connected to said mixer, said stationary horn being mounted in a heat-sealer;

a plow connected to said stationary horn;

a first product horn having a first end and a second end, said first product horn being connectable to said heat-sealer and movable from a first position whereby said first end is attachable to said downstream end of said stationary horn and said second end is proximate a clipper, to a second position remote from said stationary horn and said clipper;

a second product horn having a first end and a second end, said second product horn being connectable to said heat sealer and movable from a first position remote from said stationary horn and said clipper, to a second position whereby said first end is attachable to said downstream end of said stationary horn and said second end is proximate said clipper;

rolled stock film mounted to said plow; and tubular easing shirred onto said second product horn.

2. A method for producing food products, comprising, in any order:

providing a stationary horn;

providing a plow connected to said stationary horn;

providing a first product horn having a first end and a second end, said first product horn being connectable to a downstream end of said stationary horn and movable from a first position whereby said first end is attachable to said downstream end of said stationary horn and said second end is proximate a clipper, to a second position remote from said stationary horn and said clipper; and providing a second product horn having a first end and a second end, said second product horn being connectable to said downstream end of said stationary horn and movable from a first position remote from said stationary horn and said clipper, to a second position whereby said first end is attachable to said downstream end of said stationary horn and said second end is proximate said clipper;

placing said first product horn in said first position of said first product horn;

placing said second product horn in said first position of said second product horn;

attaching said first product horn to said downstream end of said stationary horn;

providing a flat film mounted on said plow;

turning said film over said plow and sealing said film to form rolled stock casing over said stationary horn and said first product horn;

extruding food products through said stationary horn and said first product horn to fill said rolled stock casing;

clipping said filled rolled stock casing;

shirring tubular casing onto said second product horn;

placing said first product horn in said second position of said first product horn;

placing said second product horn in said second position of said second product horn;

attaching said second product horn to said downstream end of said stationary horn;

removing said film from said plow;

extruding food products through said stationary horn and said second product horn to fill said tubular casing; and clipping said tubular casing.

* * * * *